April 7, 1925.                     1,532,798
C. BOUILLON ET AL
LATHE ATTACHMENT
Filed March 1, 1922          2 Sheets-Sheet 2
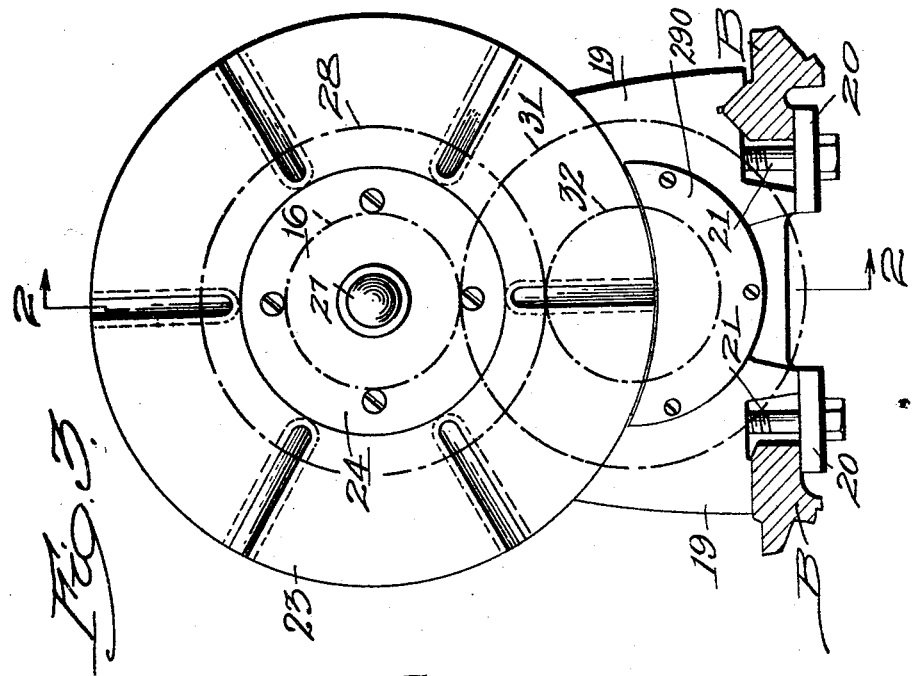
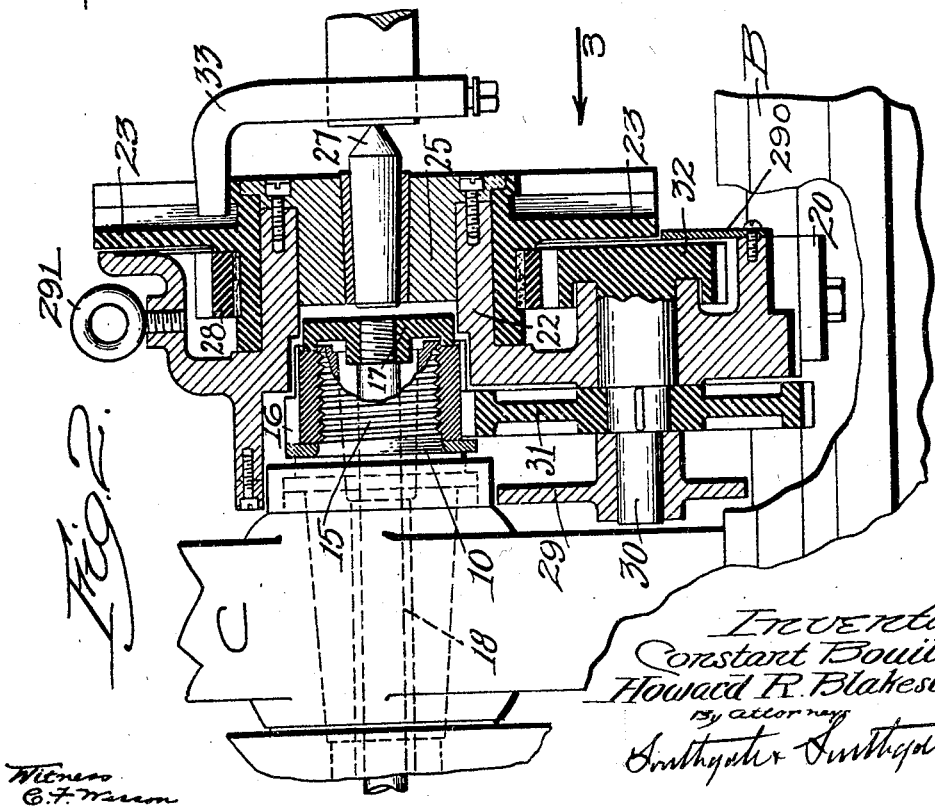

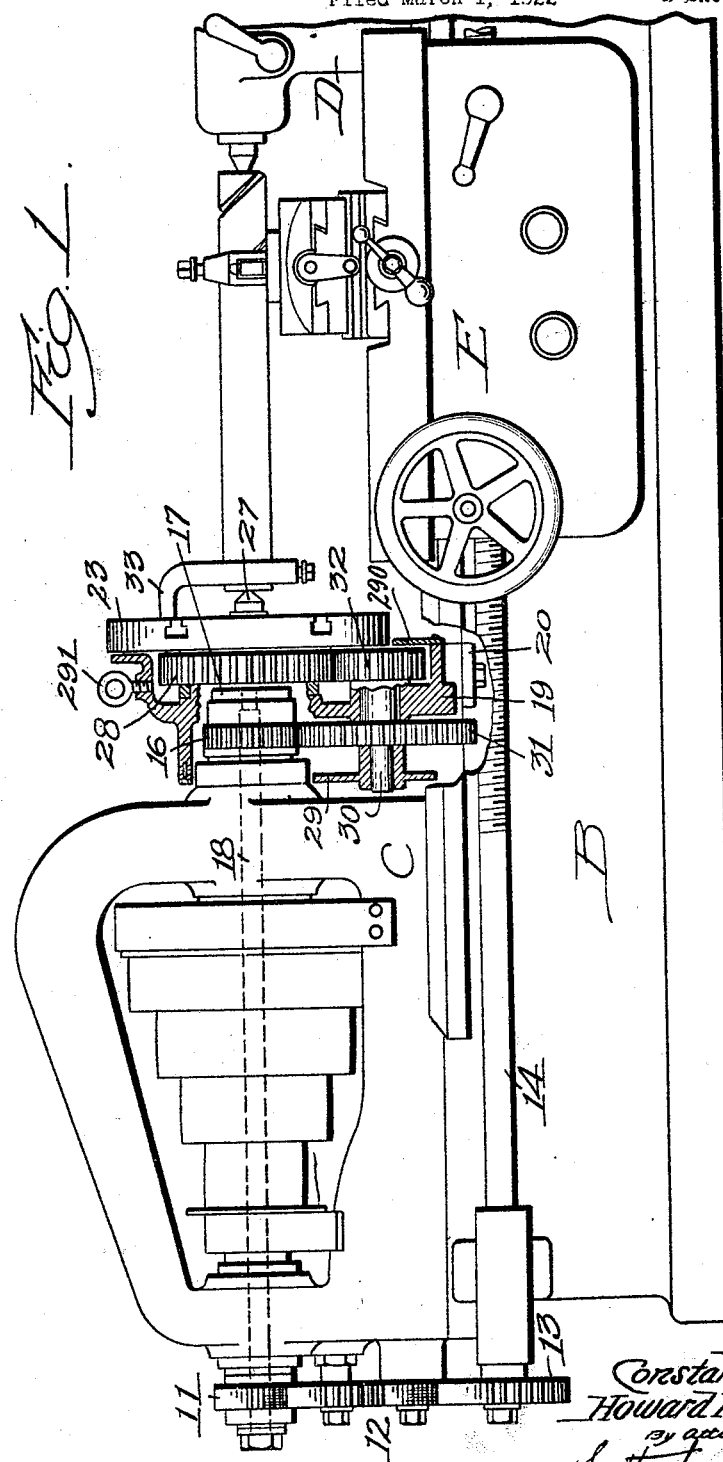

Patented Apr. 7, 1925.

1,532,798

UNITED STATES PATENT OFFICE.

CONSTANT BOUILLON AND HOWARD R. BLAKESLEE, OF TORRINGTON, CONNECTICUT, ASSIGNORS TO THE HENDEY MACHINE COMPANY, OF TORRINGTON, CONNECTICUT, A CORPORATION OF CONNECTICUT.

LATHE ATTACHMENT.

Application filed March 1, 1922. Serial No. 540,274.

*To all whom it may concern:*

Be it known that we, CONSTANT BOUILLON and HOWARD R. BLAKESLEE, citizens of the United States, residing at Torrington, in the county of Litchfield and State of Connecticut, have invented a new and useful Lathe Attachment, of which the following is a specification.

The object of our invention is to provide a new and improved attachment for a lathe, particularly a metal turning engine lathe, constructed so that the driving plate for revolving the work can be driven at a different speed, preferably a slower speed, than the live spindle.

The invention is illustrated in the accompanying two sheets of drawings, referring to which and in detail—

Fig. 1 is a front elevation partly in section of part of an engine lathe with our attachment applied thereto;

Fig. 2 is a sectional elevation on an enlarged scale of the attachment; and

Fig. 3 is a side elevation thereof.

Referring to the drawings, and in detail, B designates the bed, C the head-stock, D the tail-stock, and E the traveling carriage of an engine lathe.

The usual live spindle 10 is journalled in the head-stock, and the same is connected by change gears 11, 12 and 13 to rotate a lead screw 14, which engages a nut in the carriage in the usual way to feed the carriage along on the bed.

The end of the live spindle 10 is provided with screw threads 15 on which a driving plate can be screwed when the lathe is to be used in the ordinary way, when our attachment is not employed.

When our attachment is to be used, the ordinary driving or face plate and the center are removed from the live spindle and a pinion 16 is screwed on the end of the live spindle 10, which pinion may be kept in place by a locking plate 17 held in position against the pinion 16 by a bolt 18 passed through the live spindle and having a head or nut on its outer end.

A housing or casing 19 has its underside finished to fit on the V's or shears of the lathe bed, and the same is held in place thereon by clamps 20 and clamping bolts 21. This housing 19 carries a hub 22, machined both inside and out, and arranged in position so that when the attachment is secured in place on the lathe bed, said hub will align axially with the live spindle 10.

A driving or face plate 23 provided with slots or notches is journalled on the outside of said hub, and is held in position axially thereon by a flanged bushing 24 which is held by screws to the face of said hub. Thus the face plate is supported by and journalled in the casing independently of the live spindle, whereby important results and advantages are obtained as hereinafter described. This flanged bushing 24 is provided with a bushing 25 which is driven or secured in place and which is accurately bored or ground out on a taper to receive a work-holding center 27. A gear 28 is keyed or secured on the face plate 23.

A plate or wall 29 is fastened to or is cast integral with the housing or casing 19. A shaft 30 is journalled in said housing and plate and carries or has keyed thereon a gear 31 and a pinion 32 meshing with the gear 28 on the face plate 23. The housing and the plate or wall 29 are formed or shaped to cover up the gears.

The attachment can be quickly placed in position by securing the pinion 16 on the end or nose of the live spindle, by placing the attachment on the lathe bed and by sliding the same towards the head-stock so that the gear 31 will mesh with the pinion 16 and by then clamping the housing in position.

By the arrangement described the face or driving plate 23 will be driven through the gearing, and this gearing preferably is designed and arranged so that the face plate will be driven at a slower speed than the live spindle.

A shield or plate 290 may be attached to the housing 19 to protect the gearing and to prevent chips from getting into the same. An eye-bolt 291 may be secured to the housing so that the attachment can be lifted from the lathe bed by a chain hoist.

In the specific mechanism illustrated, the reduction between the pinion 16 and gear 31 is one to two, and the reduction between the pinion 32 and the gear 28 is one to two. Hence the driving plate 23 will be driven at one-quarter of the speed of the live spindle.

It will also be noticed that when the work is placed in position between the center 27 and the center in the tail-stock it will be supported by dead centers at both ends. When the work is placed on these dead centers it is driven by the usual dog 33 which is clamped on the end of the same, and which has its end engaged in one of the slots or notches in the face plate 23.

With the ratio of gearing before described it will be seen that with the work thus placed in position that the same makes one revolution to four revolutions of the live spindle. If the live spindle is geared one to one to the lead screw, the lead screw in turn will make four revolutions for each revolution of the work. Assuming the lead screw to have four threads to the inch, it is evident that the carriage carrying the tool when engaged with the lead screw will advance one inch to every turn of the work, whereas without the attachment the advance would have been only one-quarter of an inch with the same gearing. This ratio holds true with any train of gearing used between the spindle and lead screw. This permits the chasing or cutting of threads or spirals on the work with a long lead or rapid pitch without resorting to change gears of high ratio between the live spindle and the lead screw. This very rapid feeding is also useful in cases where the work is to be turned or finished with a wide faced forming or cutting tool, or in cases where the speed of the work must be very low relatively to the feed to obtain given results. Our attachment can be used to meet these demands without resorting to changes in the counter-shaft or other driving means, and at the same time enables the regular belt or drive of the lathe to carry a heavy cut.

The attachment is also useful for finishing work which must be very true cylindrically.

It will be noted that as the work is revolved, it is supported on dead centers at both ends, whereby there will be no vibration or movement of the same due to the rotation of the live spindle.

If the live spindle of an ordinary lathe is out of true or if the live center is not absolutely accurate, such vibration is apt to occur and the same will interfere with the cylindrical accuracy of the work.

The attachment as described can be easily made and sold and applied as an attachment to the regular or standard engine lathe.

The details and arrangements herein shown and described can be greatly varied by a skilled mechanic without departing from the scope of our invention as expressed in the claims.

Having thus fully described our invention, what we claim and desire to secure by Letters Patent is:—

1. The combination of a housing having a hub, a face or driving plate journalled thereon, a dead center secured in said hub, a pinion which can be attached or secured on the live spindle of the lathe, and gearing carried by said housing which will be driven by said pinion when the attachment is in place.

2. A lathe attachment comprising a housing having a hub, a face or driving plate journalled on said hub, a bushing secured in said hub and carrying a dead center, a gear secured on said face or driving plate, a shaft journalled in said housing carrying a pinion meshing with said gear and a gear, a pinion which can be secured on the end of the live spindle, the parts being arranged so that when the attachment is in place said pinion will mesh with the gear on said shaft.

3. A lathe attachment comprising a housing having a hub, a face or driving plate journalled thereon, a flanged bushing secured to the end of said hub and holding the face plate in position, a gear secured on said face plate, a shaft journalled in said housing carrying a pinion meshing with said gear and a gear, and a pinion internally screw-threaded to fit on the end or nose of the live spindle, the parts being arranged so that when the attachment is in position said pinion will engage the gear on said shaft.

4. A lathe attachment comprising a housing having a hub, a face or driving plate journalled thereon, a flanged bushing secured to the end of said hub and holding the face plate in position, a gear secured on said face plate, a shaft journalled in said housing carrying a pinion meshing with said gear and a gear, a pinion internally screw-threaded to fit on the end or nose of the live spindle, and means such as a bolt and plate for locking the pinion on the lathe spindle.

In testimony whereof we have hereunto affixed our signatures.

CONSTANT BOUILLON.
HOWARD R. BLAKESLEE.